July 11, 1967 — C. W. MacMILLAN — 3,330,044
ATTACHING MEANS FOR WHEEL GAUGES AND THE LIKE
Filed May 11, 1965

Inventor:
Charles W. MacMillan
By
Gary, Parker, Juettner & Cullinan
Atty's

United States Patent Office 3,330,044
Patented July 11, 1967

3,330,044
ATTACHING MEANS FOR WHEEL GAUGES AND THE LIKE
Charles W. MacMillan, Rock Island, Ill., assignor to Bear Manufacturing Company, Rock Island, Ill., a corporation of Delaware
Filed May 11, 1965, Ser. No. 454,777
2 Claims. (Cl. 33—203.18)

The present invention relates to improved means for attaching wheel alinement gauges and the like to the wheels of automotive vehicles.

The measurement of wheel alinement angles, principally caster, camber and steering axis inclination, by means of a gauge attached to a wheel has been in general use for a number of years. At first, the gauges were manually held to the wheel, then mechanically attached, and finally magnetically attached by means of permanent magnets engageable with the machined end face of the wheel hub. The magnetic attaching means have become highly preferred because of the ease of attachment and detachment, and the automatic location of the gauge in a plane perpendicular to the plane of the vehicle wheel, since the machined end face of the hub is an accurately formed surface parallel to the plane of the wheel. These magnetic adapters or attaching means, due to their inherent advantages, have also been employed for supporting or mounting auxiliary or related gauging devices, such for example as arms and the like employed for measuring wheel toe.

Due to recent changes in the machining dimensions and configurations of some wheel hubs, it is no longer feasible to rely on a magnetized adapter or attaching means for supporting a gauge and/or related equipment squarely against the hub face of a vehicle wheel. Some hubs, particularly on smaller cars, have the end faces machined so that the periphery of metal against which a magnet could bear is so thin that the magnetic holding force is insufficient to support the weight of the gauge or other apparatus which may be attached thereto.

The object of the present invention is to provide improved gauge attaching or adapter means engageable with the hub face of the wheel, thereby to attain the prime advantage of the magnetic adapter, and also including means for mechanically holding the adapter to the wheel hub when the magnetic holding force is inadequate. Specifically, it is the object of this invention to provide improved gauge attaching or adapter means comprising, in combination, magnetic holding means in the character heretofore employed and mechanical locking means for positively securing the magnetic means to the wheel hub with the magnet abutted against the machined end face of the hub. Advantageous results of such combination, in addition to the obvious advantages, are provision of a universal attaching means applicable to all hubs, whether magnetic or non-magnetic and whether having a magnetically adequate face dimension or not; and provision, in cases of a magnetically inadequate face dimension, of magnetic means for alining and holding the gauge or other device on the hub while the mechanical locking means are applied.

Other objects and advantages of the invention will become apparent in the following detailed description.

Now, in order to acquaint those skilled in the art with the manner of making and using my improved attaching means, I shall describe, in connection with the accompanying drawings, preferred embodiments of the attaching means and preferred manners of making and using the same.

In the drawings, wherein like reference numerals indicate like parts;

Figure 1:
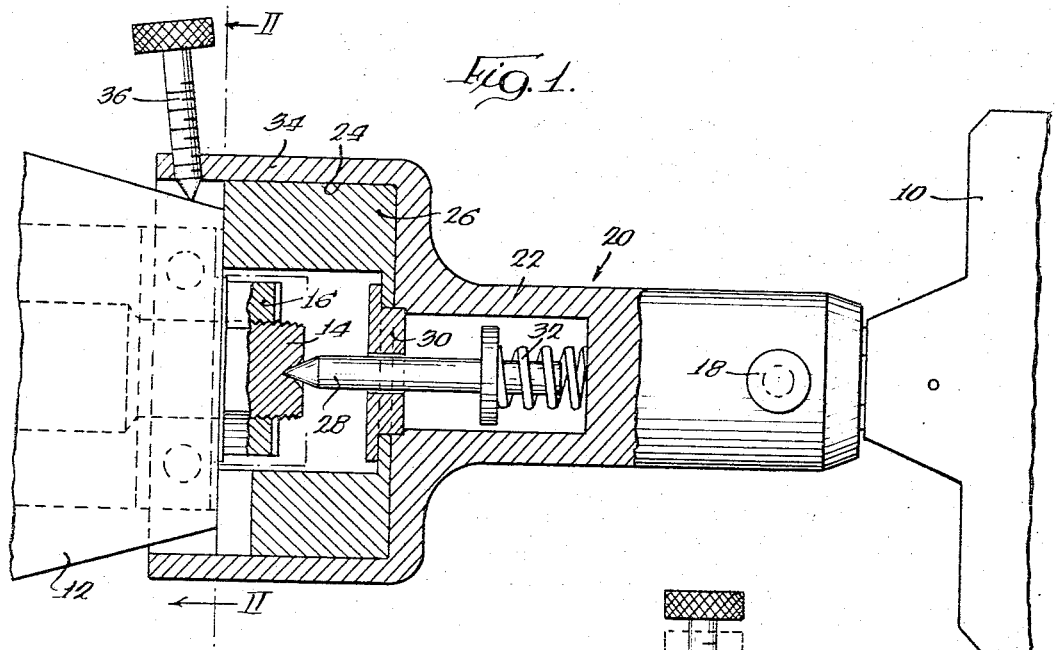
FIGURE 1 is a view, partly in plan and partly in horizontal section, looking downwardly on a wheel hub, a gauge adapter formed in accordance with the present invention and a wheel alinement gauge.

Referring to the drawings, I have shown a wheel alinement gauge 10 associated with the hub 12 of a front or steering wheel of an automotive vehicle by means of an adapter or attaching means 20 forming the subject matter of this invention. The gauge 10, may, for example, be of the type disclosed in my Patent 3,071,863, and the same is preferably removably associated with the adapter by means of a thumb screw 18 in the same manner as described in said patent. If desired, the adapter and gauge may also have toe measuring means associated therewith, as shown for example in my Patent 3,135,052.

The adapter or attaching means 20 comprises a body 22 having a large diameter cylindrical socket 24 at one end thereof receiving therein an annular permanent magnet 26, which is preferably notched or serrated at its outer or front face to provide a plurality of circumferentially spaced pole pieces. Each pole piece has a flat front face, and all of the faces are disposed in a common plane perpendicular to the axis of the body 22. In use, the magnet surrounds the wheel spindle or axle 14 and nut 16, and the pole faces of the magnet are engaged with the flat, accurately machined outer end face of the hub 12 of the wheel. To aline the magnet with the wheel and its spindle, the adapter preferably includes an automatically retractable centering pin 28 adapted to be seated in the axial recess conventionally provided in the outer end face of the wheel spindle 14. The pin 28 is slidably mounted in an axial bore in the adapter body, slidably guided by a closure plate 30 secured to the adapter body, and resiliently urged in the outward direction by spring 32 confined between the bottom of the bore and a motion limiting collar or flange on the pin. As a consequence of the defined structure, the adapter is readily applied to the vehicle wheel with the face of the magnet perpendicular to the axis of wheel rotation.

Figures 2, 3:
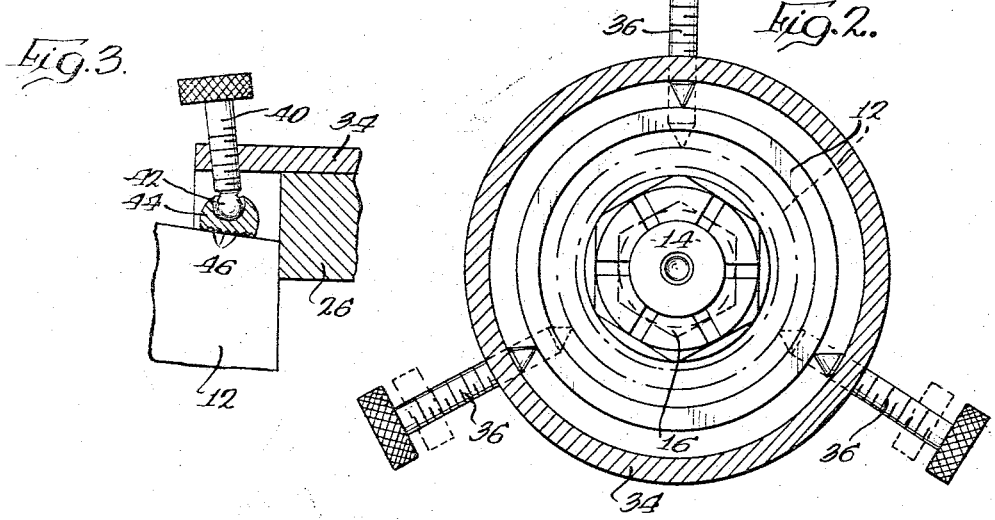
FIGURE 2 is a vertical cross-section illustrating a preferred embodiment of the mechanical locking means incorporated in the adapter of FIGURE 1, the view being taken substantially on line II—II of FIGURE 1 and showing the adapter as associated with a large hub in solid lines and a small hub in dotted lines.
FIGURE 3 is a fragmentary longitudinal section of a modified form of mechanical locking means.

The adapter of this invention is characterized in that the body 22 is formed with an elongate tubular shell 34 (forming the socket 24) which is of an inner diameter greater than the outer diameter of the wheel hubs to be accommodated, the magnet 26 is deeply seated in said socket inwardly of the extremity of said shell, and mechanical locking means are provided on the outer portions of said shell forwardly of the front face of said magnet. In FIGURES 1 and 2, the mechanical locking means takes the form of a plurality of pointed set screws 36, preferably three in number set at equal or unequal circumferential spacings, threaded through the shell 34 and adapted to be manually threaded into biting engagement with the exterior surface of the hub 12. The points of the screws 36 are hardened to permit them to become embedded in the softer metal of the wheel hub during the holding operation, and the screws are preferably set at an angle directed toward the face of the magnet so that the screws draw the magnet toward the hub face as they are tightened.

In FIGURE 3, a modified form of locking screw is illustrated as comprising a thumb-screw 40 having a spherical end 42 affording a swivel mount for the socket portion of a foot 44 which has hardened teeth 46 at its base. This screw automatically seeks a squared-up position on the surface of the hub, and the hardened teeth thereof tend to dig in to the surface of the hub to accomplish essentially the same result as the pointed screws of FIGURES 1 and 2.

Figure 4:
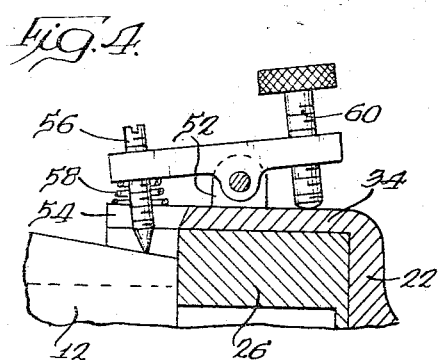
FIGURE 4 is a fragmentary longitudinal sectional view of a lever and fulcrum embodiment of the mechanical locking means.

In FIGURE 4, a further modification of the mechanical locking means, in the form of a lever and fulcrum arrangement, is illustrated as comprising a lever 50 pivoted on a fulcrum 52 formed on the shell 34 and extending radially therefrom. A pointed locking screw 56 is adjustably threaded through the outer end of the lever 50, the same passing through a slot 54 in the shell 34 for engagement with the wheel hub and normally being biased away from the hub by a spring 58. A thumb-screw 60 is adjustably threaded through the other end of the lever 50 and engages the exterior surface of the shell 34 for moving the pointed screw 56 into and out of locking engagement with the wheel hub. By appropriate adjustment of the screw 56 and the lever 50, the screw, due to its arcuate movement, may pull the magnet into engagement with the wheel hub as described in connection with FIGURE 1. A particular advantage of the structure of FIGURE 4 is that the thumb-screws 60 are spaced outwardly from the lugs that hold the wheel to the hub 12, whereby the thumb-screws may easily be manipulated.

In operation, with the screws or locking fingers retracted, the adapter is moved toward the wheel to receive the hub 12 within the shell 34 and to engage the pin or plunger 28 with the wheel spindle 14, whereafter the magnet is moved flush against the wheel hub. After the adapter is placed against the hub it may be rotated slightly to insure removal of any small particles of dirt so that a firm, square contact is assured between the face of the magnet and the face of the hub. It then merely remains to tighten the screws (36, 40 or 60) to bring the holding power of the mechanical locking means against the exterior of the hub. The screws are first tightened gently one at a time against the surface of the hub, and after contact has been made with all of the screws, they are firmly tightened in alternate sequence.

As shown in FIGURE 2, the screws have a substantial degree of longitudinal adjustability so as to adapt themselves to a wide variety of wheel hubs, from small diameter hubs such as indicated in dotted lines to large diameter hubs such as shown in solid lines. The increased holding power provided by the screws particularly facilitates adaptation of the attaching means to a broader range of wheel hubs than would normally be feasible with magnetic holding means alone.

If the wheel hub is ferro-magnetic and the machined end face thereof has a large surface area engageable with the magnet, the holding power of the magnet may be used alone or may be supplemented by the mechanical locking means, as desired. If the hub is ferro-magnetic, but the end face thereof does not accommodate sufficient magnetic holding power to be reliable during wheel tests, the magnet will generally provide sufficient holding power to maintain the adapter in a centered position on the wheel hub, thereby freeing the operator's hands for application of the mechanical locking means. If the hub accommodates no magnetic holding force, or practically no sensible degree thereof, the pin 28 and the face of the magnet still provide accurate locating surfaces whereby the adapter may be held in accurately located position on the hub with one hand while the operator applies the mechanical locking means with his other hand. The adapter or attaching means is thus universally applicable to all types of hubs and is firmly held thereon.

With the attaching means thus firmly secured against the machined end face of the wheel hub, the weight which may be attached to the adapter in the form of gauges of any type may be greatly increased without fear of the attaching means falling from its position. In this connection, the possible weight increase on some hubs is as much as ten times.

In addition to the advantages of the extra weight carrying capacity, the attaching means described also provides a firmly attached adapter which is in perfect alinement with the spindle axis, due particularly to the plunger or pin 28 as shown in FIGURE 1. Inasmuch as the measurement of toe by extending arms forwardly of the wheels and sighting from one side to the other (see Patent 3,135,052) may require the the accurate location of the arms with respect to the spindle centers, the present invention attains such purpose.

Thus, all of the objects and advantages of the invention have been shown herein to be attained in a convenient, economical and practical manner.

While I have shown and described what I regard to be the preferred embodiments of my invention, it is to be appreciated that various changes, rearrangements and modifications may be made therein without departing from the scope of the invention, as defined by the appended claims.

I claim:

1. Means for attaching wheel alinement gauges and the like to vehicle wheels having a hub with a machined end face, comprising body means having an elongate tubular shell defining a forwardly open socket at one end thereof of a size to receive the wheel hub, a permanent magnet deep set in said socket and having a forward end face engageable with the end face of the wheel hub, and a plurality of circumferentially spaced screws threaded through a portion of said shell which extends forwardly beyond said magnet and surrounds the end of said hub, said screws being disposed forwardly of the face of said magnet for physical engagement with the periphery of the wheel hub, and each of said screws being inclined in the radially inward direction toward said face of said magnet to draw said magnet into engagement with said face of the wheel hub.

2. Means for attaching wheel alinement gauges and the like to vehicle wheels having a hub with a machined end face, comprising body means having a tubular shell defining a forwardly open socket, a permanent magnet in said socket having a forward end face engageable with the end face of the wheel hub, and a plurality of circumferentially spaced locking means mounted on said shell about said magnet, each of said locking means comprising a lever pivoted on said shell, a locking member on said lever forwardly of the face of said magnet and movable generally radially of said shell for physical engagement with the periphery of the wheel hub, and a screw threaded through the other end of said lever and engaging said shell for moving the locking member into and out of engagement with the wheel hub.

References Cited
UNITED STATES PATENTS

| | | | |
|---|---|---|---|
| 922,143 | 5/1909 | Holmes | 33—84 |
| 2,059,654 | 11/1936 | Quigley | 33—203.18 |
| 2,079,070 | 5/1937 | Johnston | 33—203.18 |
| 2,136,592 | 11/1938 | Mayer | 85—1 |
| 2,438,358 | 3/1948 | Castiglia | 33—203.12 |
| 2,645,860 | 7/1953 | Bender et al. | 33—203.18 |
| 2,724,298 | 11/1955 | Olson | 85—1 |
| 3,071,863 | 1/1963 | MacMillan | 33—203.18 |
| 3,094,787 | 6/1963 | Moore | 33—161 |

LEONARD FORMAN, *Primary Examiner.*

W. D. MARTIN, *Examiner.*